H. QUINN.
Grain Drier.

No. 6,163.

2 Sheets—Sheet 1.

Patented March 10, 1849.

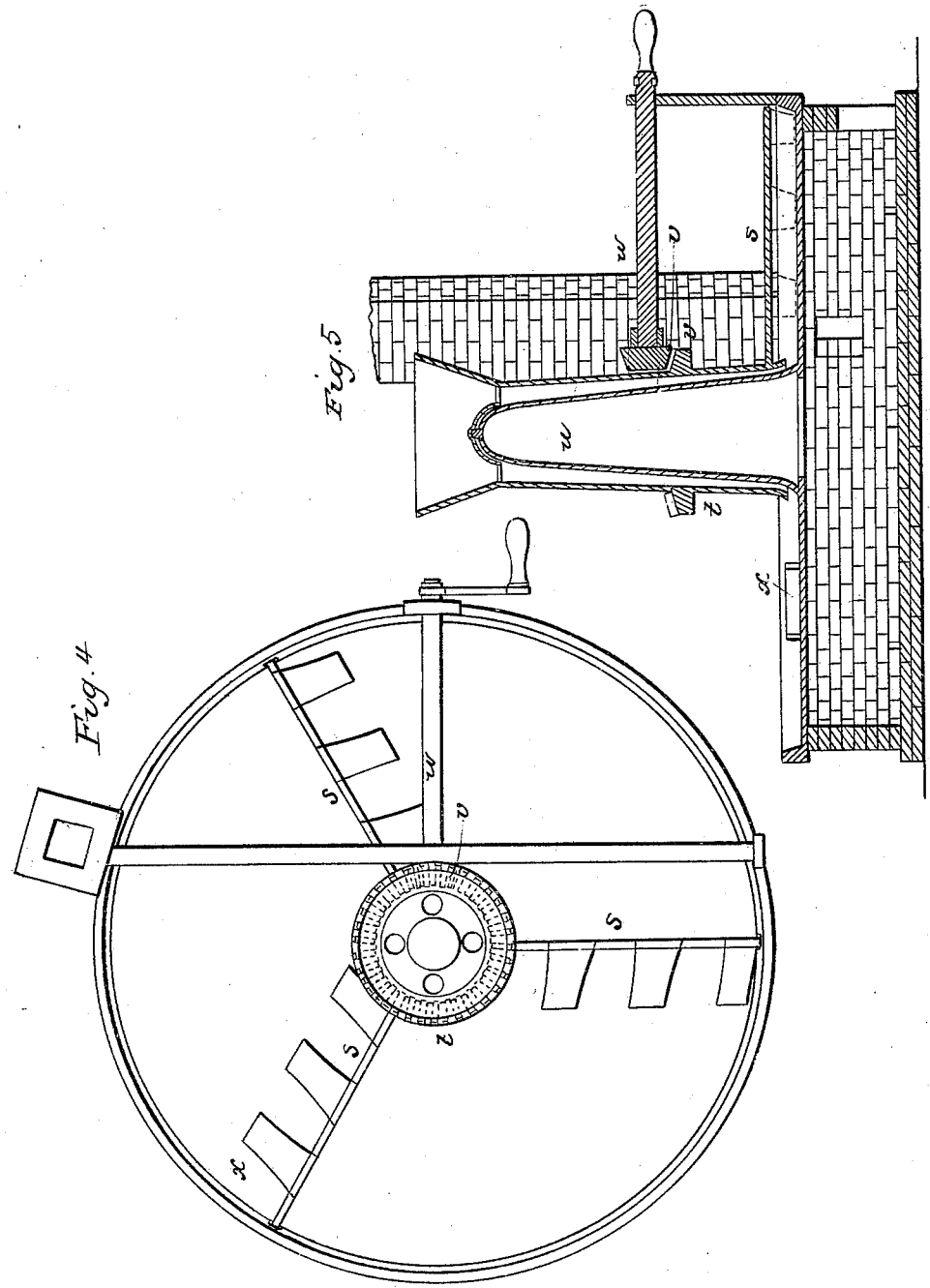

UNITED STATES PATENT OFFICE.

HENRY QUINN, OF NEW ALEXANDRIA, NEW JERSEY.

DRYING GRAIN.

Specification of Letters Patent No. 6,163, dated March 10, 1849.

*To all whom it may concern:*

Be it known that I, HENRY QUINN, of New Alexandria, in the county of Hunterdon and State of New Jersey, have invented new and useful Improvements in the Kiln for Drying Corn and other Grain; and that the following is a full, clear, and exact description of the principle or character which distinguishes them from all other things before known and of the manner of making, constructing, and using the same, reference being had to the accompanying drawings, making part of this specification, in which—

Figure 1:
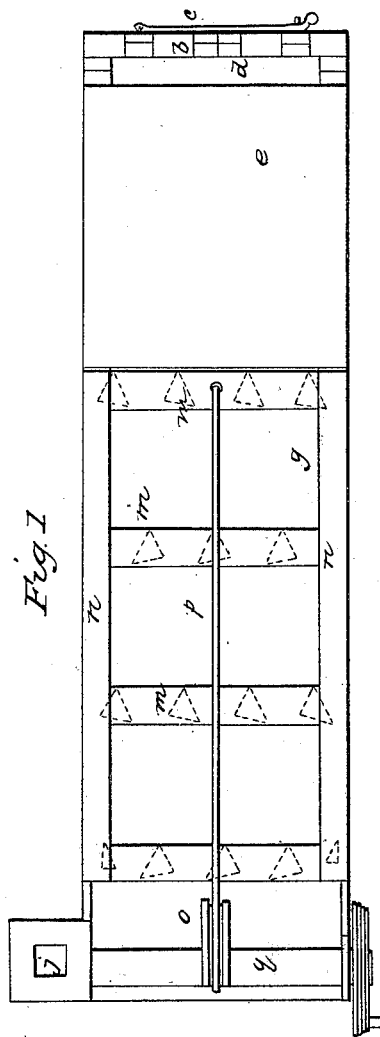
Figure 2:
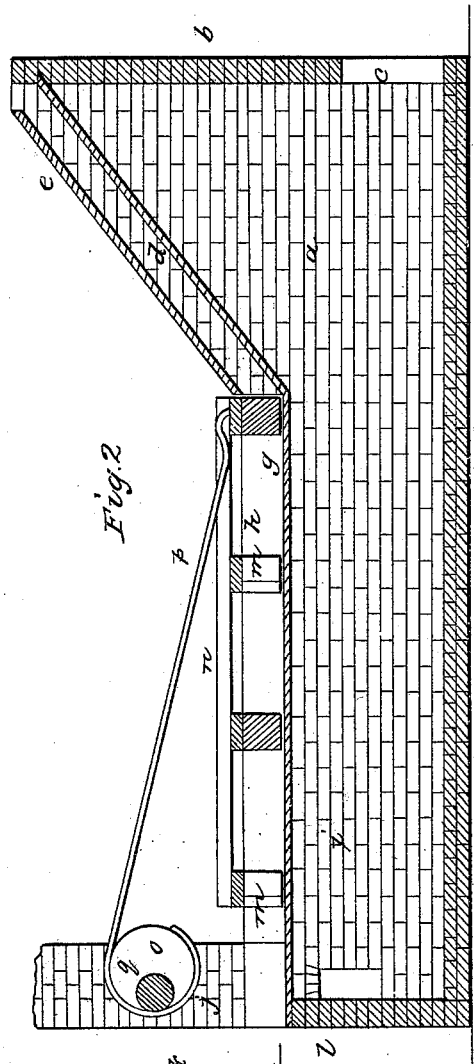
Figure 3:
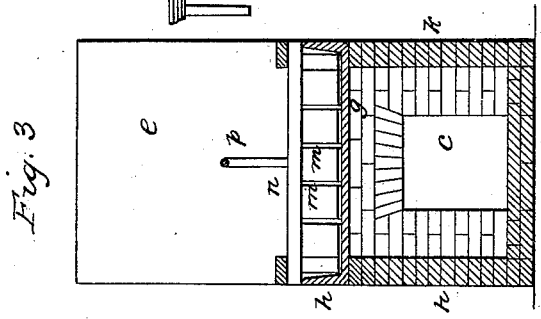

Figure 1 is a plan of the kiln; Fig. 2, a longitudinal vertical section; and Fig. 3, a cross vertical section of the same; and Figs. 4 and 5, a plan and vertical section of a different mode of applying the principle of this invention.

The same letters indicate like parts in all the figures.

In all kilns heretofore made for drying corn and other grain, the grain passes through a rotating cylinder or shaking pan confined within the heating apartment, which in a great measure confines the moisture evolved, instead of giving it a free discharge. And as the grain is carried through by the motion of the vessel containing the grain, the apparatus becomes necessarily costly, and liable to derangement.

The object of my invention is to reduce the cost of the apparatus and its liability to derangement, and at the same time, to dry the grain with a reduced consumption of fuel; all of which I effect by causing the grain to descend from a hopper over and down a heated inclined plane to a stationary drying pan, over which it is moved slowly by a rake, as it may be termed, which not only moves it from one end of the pan to the other, but which spreads it evenly over the surface of the pan, and stirs it, that the moisture may freely escape in the form of vapor. And with the view to economize fuel, the inclined plane down which the grain descends to the pan is placed over the fire, and the pan over the flue leading to the chimney, so that there shall be a chamber of confined heated air under the feeding inclined plane formed by the inclined plane and the closed end of the fire chamber above the door thereof. The draft from the fire under the inclined plane will pass along under the pan to the chimney at the rear end, and the triangular space under the inclined feeder will be always filled with heated air to give the required heat to the inclined feeder to prepare the grain for the drying operation while passing over the pan, where, being open to the air and stirred by the rake, it will give out the moisture freely. The stirring rake is formed of alternate rows of inclined teeth, the inclinations of which are reversed in the alternate rows.

In the accompanying drawings (*a*) represents a fireplace of any desired construction, adapted at pleasure to any kind of fuel; the front end (*b*) is closed with the exception of a door (*c*) for introducing the fuel and admitting air to the fire. Immediately over the fireplace is placed a metal plate (*d*), which inclines down from the front of the fireplace at an angle of about forty degrees, and over this is placed a cap plate (*e*), leaving a sufficient space, called the feeder, between the two for the passage of grain from a hopper above to the pan (*g*) below. This pan (*g*) is made of a plate or plates of metal, extending from the lower end of the inclined feeder back to any length required, with a slight inclination downward to facilitate the moving of the grain over it from the feeder to the delivery end at the back—it is made with side flanches (*h, h*) to prevent the grain from falling off at the sides, and its under surface constitutes the top of a horizontal flue (*i*), leading from the fire chamber to a chimney (*j*) at the back—the side walls (*k, k*) forming the sides of the flue, and the end wall (*l*) the back end thereof to direct the draft to the chimney.

The rake is composed of four or more rows of teeth (*m*), projecting down from a frame (*n*), that slides on the side flanches of the pair, and connected by a rod (*p*) with an eccentric or crank (*o*) on a shaft (*q*). The teeth (*m*) of this rake are in their horizontal sections right angled triangles, placed in slightly diagonal lines with the frame, and the alternate rows reversed, as shown by dotted lines in the plan, so that when the rake reciprocates the grain shall be moved first toward one side and then toward the other, and the whole mass gradually toward the delivery end at the back.

From the above it will be seen that the fire will heat the air which occupies the triangular space below the feeder, and thus communicate a gentle and regular heat to the feeder and to the grain, as it passes down the inclined feeder to the pan, so that when it reaches the pan, which is more highly heated by the passage of the flame and other products of combustion under it, the moisture in the grain will be sufficiently heated to evaporate. It is important in kiln-drying grain to apply a gentle heat at first to the grain, for the reason that in general the outer cover of the grain is dry, and the moisture inside, and in that condition, if it be passed over highly heated metal at first and before the moisture is drawn to the surface, it will be injured. By the methods heretofore practised the temperature of the entire kiln must be kept low on this account, but on my improved plan the grain receives a gentle and gradual heat to draw the moisture to the surface as it descends through the feeder, and when it reaches the pan which is more highly heated by the direct draft, the service is in a moist condition, and can sustain a higher temperature to evaporate the moisture, which is aided by the action of the rake, and given out freely to the atmosphere.

I contemplate sometimes to vary the form of the kiln by making the pan circular, as shown in Figs. 4 and 5, and attaching the rakes to arms (s) projecting from the lower end of a tube (t), the upper end of which rests on the upper end of a conical tube (u), so that by turning the said tube by cog wheels (v v) and horizontal shaft (w) the rakes can be carried around and gradually carry the grain toward the periphery of the pan, the outer flanch of which is pierced at (H) for the delivery of the dried grain. The grain is fed from the hopper in between the tubes (t) and (u), which conducts it to the pan, and in passing down between these two tubes it is gradually heated by the hot air in the central tube, in manner similar to the inclined feeder before described.

It will be obvious from the foregoing that the form of the apparatus can be variously modified without changing the principle of my invention, so long as the grain is carried through and prepared in a feeder to be delivered for the final drying operation to a stationary heated pan, and moved over this and stirred to liberate the moisture by means of a rake.

What I claim therefore as my invention and desire to secure by Letters Patent is—

The method of drying grain in an open stationary pan having the fire and draft below it, with the rake above for stirring the grain and causing it to pass from the feeder to the delivery substantially as described, whereby the moisture in the grain is more readily evaporated and liberated, and the apparatus constructed at less cost and with less liability to derangement than by any other plan before known, when this is combined with the feeder heated by a hot air chamber, substantially as described, whereby the grain is gradually heated in the feeder to draw out the moisture before it is exposed to a higher temperature in the pan to be evaporated, as described.

HENRY QUINN.

Witnesses:
ALEXR. PORTER BROWNE,
CH. L. JOLLINMANNTT.